US010266004B2

(12) United States Patent
Vorbeck et al.

(10) Patent No.: US 10,266,004 B2
(45) Date of Patent: Apr. 23, 2019

(54) WHEEL DISC FOR A DISC WHEEL

(71) Applicant: Maxion Wheels Germany Holding GmbH, Königswinter (DE)

(72) Inventors: Hans-Joachim Vorbeck, Bonn (DE); Karl Manfred Michael Rode, Königswinter (DE); Barbara Nücken, Königswinter (DE); Peter Matthias Grütgen, Königswinter (DE); Carlos Eduardo Lopes, Sao Paulo (BR)

(73) Assignee: Maxion Wheels Germany Holding GmbH, Königswinter (DE)

( * ) Notice: Subject to any disclaimer, the term of this patent is extended or adjusted under 35 U.S.C. 154(b) by 112 days.

(21) Appl. No.: 15/507,288

(22) PCT Filed: Aug. 27, 2015

(86) PCT No.: PCT/IB2015/056502
§ 371 (c)(1),
(2) Date: Feb. 28, 2017

(87) PCT Pub. No.: WO2016/038495
PCT Pub. Date: Mar. 17, 2016

(65) Prior Publication Data
US 2017/0291447 A1     Oct. 12, 2017

(30) Foreign Application Priority Data

Aug. 29, 2014   (DE) ................ 20 2014 104 068 U

(51) Int. Cl.
*B60B 3/04*     (2006.01)
*B60B 3/00*     (2006.01)
(Continued)

(52) U.S. Cl.
CPC ................ *B60B 3/04* (2013.01); *B60B 3/007* (2013.01); *B60B 3/02* (2013.01); *B60B 3/12* (2013.01);
(Continued)

(58) Field of Classification Search
CPC .... B60B 3/04; B60B 3/02; B60B 3/12; B60B 3/007
See application file for complete search history.

(56) References Cited

U.S. PATENT DOCUMENTS 3,262,191 A  *  7/1966  Albertson ............. B21D 53/26
                                                29/894.325
3,627,382 A     12/1971  Lejeune
(Continued)

FOREIGN PATENT DOCUMENTS

CN     1029005911 A    1/2013
DE       1964393 A1    6/1970
(Continued)

OTHER PUBLICATIONS

German Search Report, Application No. DE202014104068.4 dated Feb. 23, 2015.

*Primary Examiner* — Kip T Kotter
(74) *Attorney, Agent, or Firm* — MacMillan, Sobanski & Todd, LLC

(57) ABSTRACT

A wheel disc for a disc wheel, especially for utility vehicles; with an essentially radially extending hub fitting flange and an essentially cylindrical disc edge which can be joined to a wheel rim, and with a transition region extending between the hub fitting flange and the disc edge, wherein the transition region is subdivided into at least five segments ($A_{I \text{ to } V}$) passing into each other or into the hub fitting flange or the disc edge, each of which has an outer end situated closer to
(Continued)

the hub fitting flange and an inner end situated closer to the disc edge, wherein neighboring segments have curvatures with different directions and variable material thickness, with the ratios of the material thicknesses and the ratio of their lengths to heights are chosen as follows:

|  | Ratio of Material thickness at inner end (di) to Material thickness at outer end (da) | Ratio of Length in axial direction ($L_a$) to Height in radial direction ($H_r$) |
|---|---|---|
| First segment $A_I$ (between the hub fitting flange and segment $A_{II}$) | 0.45-0.7 | 0.9-1.1 |
| Second segment $A_{II}$ (between $A_I$ and $A_{III}$) | 0.7-1.0 | 1.6-1.9 |
| Third segment $A_{III}$ (between $A_{II}$ and $A_{IV}$) | 0.9-1.25 | 2.5-2.8 |
| Fourth segment $A_{IV}$ (between $A_{III}$ and $A_V$) | 0.9-1.25 | 2.8-3.1 |
| Fifth segment $A_V$ (between $A_{IV}$ and the disc edge). | 0.7-1.15 | 7.0-6.8 |

14 Claims, 2 Drawing Sheets

(51) Int. Cl.
  *B60B 3/12* (2006.01)
  *B60B 3/02* (2006.01)
(52) U.S. Cl.
  CPC ... *B60B 2360/102* (2013.01); *B60B 2360/141* (2013.01); *B60B 2900/111* (2013.01); *B60B 2900/114* (2013.01); *B60B 2900/311* (2013.01); *B60Y 2200/10* (2013.01); *B60Y 2200/20* (2013.01); *Y02T 10/86* (2013.01)

(56) References Cited

U.S. PATENT DOCUMENTS

| | | | |
|---|---|---|---|
| 3,823,591 | A | 7/1974 | Schroeder et al. |
| 4,456,308 | A | 6/1984 | Opel et al. |
| 5,577,810 | A * | 11/1996 | Abe ............ B21D 53/26 29/894.323 |
| 5,794,340 | A | 8/1998 | Pollkoetter |
| 6,332,653 | B1 * | 12/2001 | Shimizu ............ B60B 3/005 301/63.101 |
| 6,571,590 | B1 | 6/2003 | Friese |
| 7,251,890 | B2 | 8/2007 | Atts |
| 9,511,623 | B2 | 12/2016 | Abe et al. |
| 2010/0213756 | A1 | 8/2010 | Kozaki et al. |
| 2012/0153708 | A1 * | 6/2012 | Nyunoya ............ B60B 3/007 301/63.101 |
| 2013/0057049 | A1 * | 3/2013 | Kataoka ............ B60B 3/007 301/63.101 |
| 2013/0119749 | A1 | 5/2013 | Kondo et al. |

FOREIGN PATENT DOCUMENTS

| | | | |
|---|---|---|---|
| DE | 2156551 | A1 | 6/1973 |
| DE | 7020419 | U | 7/1974 |
| DE | 2926445 | A1 | 1/1980 |
| DE | 19615675 | A1 | 10/1997 |
| DE | 19860732 | A1 | 7/2000 |
| DE | 112013001275 | T5 | 1/2015 |
| EP | 0023881 | A1 | 2/1981 |
| EP | 0205867 | A1 * | 12/1986 ............ B21D 22/16 |
| EP | 0205867 | A1 | 12/1986 |
| EP | 0761476 | A1 | 3/1997 |
| EP | 1473097 | A1 | 11/2004 |
| GB | 2025333 | A | 6/1978 |
| JP | S57134301 | A | 8/1982 |

* cited by examiner

WHEEL DISC FOR A DISC WHEEL

CROSS-REFERENCE TO RELATED APPLICATIONS

This application is a national stage of International Application No. PCT/IB2015/056502, filed 27 Aug. 2015, the disclosures of which are incorporated herein by reference in entirety, and which claimed priority to German Patent Application No. 202014104068.4 filed 29 Aug. 2014, the disclosures of which are incorporated herein by reference in entirety.

BACKGROUND OF THE INVENTION

The invention concerns a wheel disc for a disc wheel, especially for utility vehicles, with an essentially radially extending hub fitting flange and an essentially cylindrical disc edge which can be joined to a wheel rim, and with a transition region extending between the hub fitting flange and the disc edge.

Disc wheels such as are used today primarily for utility vehicles essentially consist of two formed steel parts, namely, a wheel rim and a wheel disc, which is welded at a fitting region in the essentially cylindrical encircling disc edge at the inner circumference of the rim. The production of the wheel disc usually occurs on a flow forming machine by flow forming or flow turning, in that a steel blank is clamped in the region of the hub fitting flange between an end face of a spinning chuck and a hold-down, after which the material bordering radially outwardly on the hub fitting flange and possibly already preformed is pressed and elongated by means of flow forming under rotation of the blank against a spinning chuck in order to obtain the desired contour of the transition region and the disc edge being formed at its end. Wheel discs which are made by flow forming or flow turning have uniform surfaces on their inner and outer sides and a good texture, so that they can withstand the loads occurring in driving operation of a vehicle between rim and vehicle hub. Methods and devices for flow forming or flow turning in the production of wheel discs for vehicle wheels are known for example from DE 21 56 551, DE 196 15 675 A1, DE 198 60 732 A1 or EP 1 473 097 B1.

The problem which the invention proposes to solve is to create a wheel disc for a disc wheel of the kind mentioned above which brings a weight saving as compared to the known wheel disc forms for otherwise identical or even better strength properties.

BRIEF SUMMARY OF THE INVENTION

According to the invention, this is accomplished with a wheel disc of the kind mentioned above in which the transition region is subdivided into at least five segments passing into each other or into the hub fitting flange or the disc edge, each of which has an outer end situated closer to the hub fitting flange and an inner end situated closer to the disc edge, wherein the segments have a curvature at least on a partial region of their length between their outer and their inner end and the curvatures of neighbouring segments have different directions of curvature, wherein the individual segments have at their inner ends a larger radial distance from an axis of rotation of the wheel disc than at their outer ends and wherein the wheel disc in its transition region has a variable material thickness, and wherein the ratios of the material thicknesses of the individual segments at their respective inner ends to their respective outer ends and the ratios of their lengths in the axial direction of the wheel disc to their heights in the radial direction are chosen as follows.

| | Ratio of Material thickness at inner end (di) to Material thickness at outer end (da) | Ratio of Length in axial direction ($L_a$) to Height in radial direction ($H_r$) |
|---|---|---|
| First segment $A_I$ (between the hub fitting flange and segment $A_{II}$) | 0.45-0.7 | 0.9-1.1 |
| Second segment $A_{II}$ (between $A_I$ and $A_{III}$) | 0.7-1.0 | 1.6-1.9 |
| Third segment $A_{III}$ (between $A_{II}$ and $A_{IV}$) | 0.9-1.25 | 2.5-2.8 |
| Fourth segment $A_{IV}$ (between $A_{III}$ and $A_V$) | 0.9-1.25 | 2.8-3.1 |
| Fifth segment $A_V$ (between $A_{IV}$ and the disc edge) | 0.7-1.15 | 6.0-6.8 |

The definition of the invention is based on the following assumptions as to the geometrical relations:

The ends of the individual segments are determined by the change in direction of a curvature in the transition region from convex to concave or by locations of a transition between a curved and a straight course.

The material thickness is defined as the dimension perpendicular to the wheel disc outside and inside.

The lengths of the segments in the axial direction of the wheel disc are measured from the outside of the hub fitting flange or the inner ends of the segment to the outer ends of the following segment or the outer end (the one closer to the hub fitting flange) of the disc edge.

The heights of the segments in the radial direction are measured on the outside of the transition region each time between the outer and inner end of the particular segment.

The geometrical relations presented in the following table have been found to be especially advantageous:

| | Ratio of material thickness at inner end to outer end (di/da) | Ratio of length in axial direction to height in radial direction $L_a/H_r$ |
|---|---|---|
| Segment $A_I$ | 0.54 | 1.04 |
| Segment $A_{II}$ | 0.92 | 1.74 |
| Segment $A_{III}$ | 1.02 | 2.61 |
| Segment $A_{IV}$ | 1.04 | 2.98 |
| Segment $A_V$ | 0.83 | 6.2 |

(Tolerance ±0.01)

In the case of a wheel disc with a rated diameter of 22.5 inches one could achieve with these thickness and length to height ratios weight savings of around 10% as compared to a known wheel disc, without the strength of the part being less as compared to a wheel disc of known design.

It is advantageous to the design for the second segment and/or the third segment to have a subsegment without curvature extending over a partial region of the segment length. The arrangement can be designed so that the subsegment has a material thickness ratio of its inner to its outer end of 0.9 to 1.2 and a length to height ratio of 1.4 to 1.7.

The material thickness of the first segment passing into the hub fitting flange at its outer end preferably corresponds to the material thickness of the wheel disc in the region of the hub fitting flange. The first segment then passes continuously into the hub fitting flange. The material thickness of the fifth segment passing into the disc edge at its inner end can then correspond preferably to the material thickness of the wheel disc in the region of the disc edge.

The wheel disc according to the invention in a preferred embodiment of the invention can be produced on a flow forming machine by flow forming of a metallic blank, especially a steel blank, during elongation of a preformed marginal region adjoining the clamped hub fitting flange. It is however also possible to produce the wheel disc according to the invention in a deep drawing process.

The fourth segment of the wheel disc according to the invention preferably has between its inner end and its outer end a material thickening whose thickness is 1.1 to 1.3 times the material thickness at the outer end of the fourth segment. With such a configuration, the wheel disc is given a reinforcement in the especially stressful radially outer region in the vicinity of the disc edge, without the dynamically and statically less stressful regions also having to be reinforced.

In advantageous modification, the invention creates a wheel disc in which the hub fitting flange after making ready a wheel disc blank by flow forming of a metallic, especially a steel blank, can be machined in a cutting process, especially on a lathe, and in which the transition region has an overall axial length, measured from the inside of the hub fitting flange to the inner end of the fifth segment bordering on the disc edge, wherein the segments of the transition region extend:

Segment $A_I$
from the inside of the hub fitting flange to 9% to 12% of the overall axial length.

Segment $A_{II}$
from the inner end of segment $A_I$ to 43% to 46% of the overall axial length.

Segment $A_{III}$
from the inner end of segment $A_{II}$ to 70% to 75% of the overall axial length.

Segment $A_{IV}$
from the inner end of segment $A_{III}$ to 93% to 97% of the overall axial length.

Segment $A_V$
from the inner end of segment $A_{IV}$ to the start of the disc edge (=100% of the axial length).

In such a wheel disc the material thickness of the transition region at the transition points between the segments, in relation to the material thickness of the machined hub fitting flange ($MP_0$) is preferably at

| Transition | $A_I/A_{II}$ | $= MP_1$ | : 50-55% · $MP_0$ |
|---|---|---|---|
| Transition | $A_{II}/A_{III}$ | $= MP_2$ | : 45-52% · $MP_0$ |
| Transition | $A_{III}/A_{IV}$ | $= MP_3$ | : 45-53% · $MP_0$ |
| Transition | $A_{IV}/A_V$ | $= MP_4$ | : 49-54% · $MP_0$ |
| Transition | $A_V$/disc edge | $= MP_5$ | : 40-50% · $MP_0$ |

With a wheel disc according to the invention in a preferred embodiment of the invention the material thickness of the second segment between its ends or transition points can be reduced to a value of 45% to 50% of the material thickness of the machined hub fitting flange, and so the transition region in the less stressed part in the vicinity of the hub fitting flange is thinner as compared to known wheels, which saves on material and weight. In the region near the disc edge the material thickening in the fourth segment is preferably 55% to 65% of the material thickness of the hub fitting flange, which takes account of the larger stresses prevailing there.

Other advantages of this invention will become apparent to those skilled in the art from the following detailed description of the preferred embodiments, when read in light of the accompanying drawings.

DETAILED DESCRIPTION OF THE INVENTION

Figure 1:
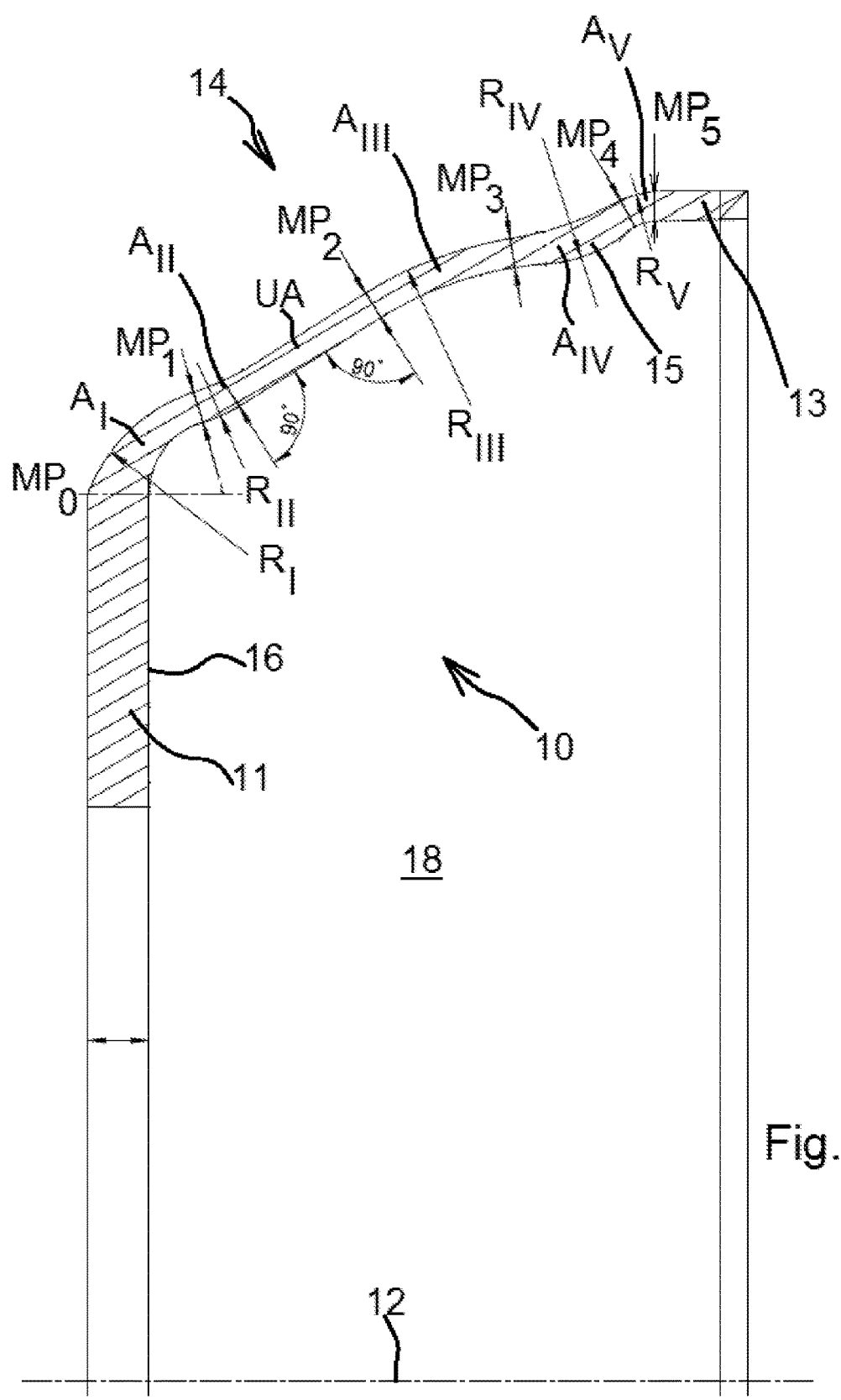
FIG. 1 is an upper half of a wheel disc according to the invention in radial cross section.
Figure 2:
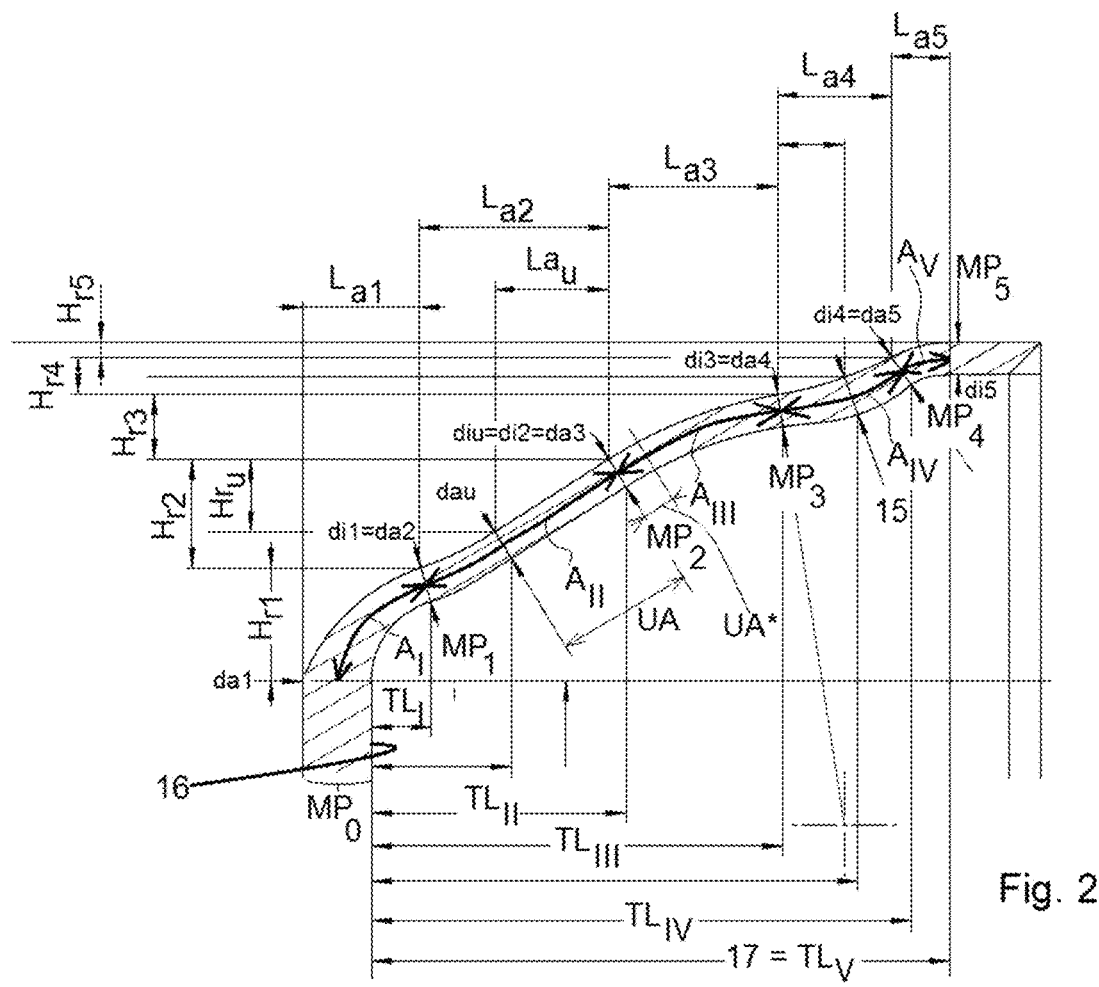
FIG. 2 is the object of FIG. 1 in the transition region between hub fitting flange and disc edge illustrating the geometrical relations relevant to the invention.

In the drawing, 10 denotes a wheel disc for a steel disc wheel of a utility vehicle. In its basic layout, the wheel disc follows known designs. It has an essentially radially extending hub fitting flange 11 and an essentially cylindrical, actually slightly conical toward the axis 12 of the wheel disc, disc edge 13 (aperture angle around 1.5°), with which the wheel disc can be joined in familiar fashion to a fitting region of a wheel rim (not shown).

Between the disc edge 13 and the hub fitting flange 11 there extends a transition region 14, which according to the invention is subdivided into at least five segments $A_I$ to $A_V$ passing into each other or into the hub fitting flange and the disc edge. In FIG. 1, the segment $A_I$ lies between the points $MP_0$ and $MP_1$, segment $A_{II}$ between the points $MP_1$ and $MP_2$, segment $A_{III}$ between the points $MP_2$ and $MP_3$, the fourth segment $A_{IV}$ between the points $MP_3$ and $MP_4$ and the last, fifth segment $A_V$ between the measurement points $MP_4$ and $MP_5$. Each of the segments $A_I$ to $A_V$ has an outer end situated closer to the hub fitting flange 11 and an inner end situated closer to the disc edge, which are located at the measurement points MP shown in the drawings. Each of the segments has a curvature at least on a partial region of its length between the respective outer and inner end, which are designated by the radii $R_I$ to $R_V$ shown in FIG. 1. The arrangement is such that the curvatures of neighbouring segments have different directions of curvature. Thus, while segment A has a convex curvature $R_I$ between the measurement points $MP_0$ and $MP_I$—as seen from the inside of the disc 18—the direction of curvature changes with the start of the second segment at measurement point $MP_I$ to a concave curvature $R_{II}$ with larger radius of curvature. After a subsegment UA of the second segment adjacent to the part with the radius of curvature $R_{II}$, which subsegment is straight, i.e., with no curvature, there follows the third segment at measurement point $MP_{II}$, which again has a convex curvature. At measurement point $MP_{III}$ once again there is a reversal of the direction of curvature to a concave curvature in segment $A_{IV}$, and finally segment $A_V$ has a convex curvature between the measurement point $MP_{IV}$ and the measurement point $MP_V$.

All segments $A_{I-V}$ have at their respective inner ends a larger radial distance from the axis of rotation 12 of the wheel disc 10 than at their outer ends situated closer to the hub fitting flange 11. The material thickness of the wheel disc in the transition region is variable, while the ratios of the material thicknesses of the individual segments $A_I$ to $A_V$ at their inner ends di to their respective outer ends da and the ratios of their lengths $L_a$ in the axial direction of the wheel disc to their heights $H_r$ in the radial direction in the preferred sample embodiment shown for a wheel disc of a vehicle wheel with 22.5 inch rim diameter are chosen as follows:

| | Ratio of material thickness of inner end to outer end (di/da) | Ratio of length in axial direction to height in radial direction $L_a/H_r$ |
|---|---|---|
| Segment I | 0.54 | 1.04 |
| Segment II | 0.92 | 1.74 |
| Segment III | 1.02 | 2.61 |
| Segment IV | 1.04 | 2.98 |
| Segment V | 0.83 | 6.2 |

(Tolerance ±0.01)

The material thickness ratio diu/dau of the subsegment UA in the preferred sample embodiment shown is 1.02 to 1.04, i.e., the thickness of the disc changes only slightly between the outer end and the inner end of the subsegment. Also in the third segment $A_{III}$ the material thickness $da_{III}$ increases only slightly to $di_{III}$ from the outer end to the inner end, the material thickness ratio here being between 1.01 and 1.03. In segment $A_{IV}$ likewise absolutely no excessive increase in thickness is found between the thickness at the outer end $da_{IV}$ and the thickness at the inner end $da_{I'}$, the ratio $di_{IV}/di_{III}$ being between 1.03 and 1.05, yet still the segment $A_{IV}$ has a substantial material thickening 15 between its two ends, whose thickness is 1.1 to 1.3 times the material thickness at the outer end $da_{IV}$ of the fourth segment $A_{IV}$. This thickening of the material takes into account the fact that the wheel disc experiences greater stresses in this region than for example in the segments lying closer to the hub fitting flange.

The wheel disc according to the invention can be produced on a flow forming machine by flow forming of a metallic, i.e., steel blank under elongation of a preformed marginal region adjoining the clamped hub fitting flange 11, wherein this marginal region in the finished state of the wheel disc then forms the transition region and the disc edge. Between the measurement points shown in the drawings, at which the individual segments pass into one another, the course of the elongation during the fabrication is essentially continuous, while a thickness tolerance in the elongation region of ±3% is realistic. In general, the hub fitting flange after fabrication of the rough wheel disc by flow forming of a steel blank will be machined in a cutting process, especially on a lathe. If one defines the overall axial length as the length between the inside 16 of the hub fitting flange 11 and the inner end of the fifth segment $A_V$ adjoining the disc edge at the measurement point $MP_V$ and sets this overall axial length 17 equal to 100%, then the segments $A_I$ to $A_V$ extend across the following partial lengths $TL_{I\ to\ V}$:

Segment $A_I$
from the inside of the hub fitting flange: 9%-12% of the overall axial length 17.

Segment $A_{II}$
from the inner end of segment $A_I$ to 43%-46% of the overall axial length.

Segment $A_{III}$
from the inner end of segment $A_{II}$ to 70%-75% of the overall axial length.

Segment $A_{IV}$
from the inner end of segment $A_{III}$ to 93%-97% of the overall axial length.

and Segment $A_V$
from the inner end of segment $A_{IV}$ to the start of the disc edge (100% of the axial length).

If one forms the ratio of the material thickness at the transition points MP between the segments and the material thickness $MP_0$ of the machined hub fitting flange, the material thickness at the transition between segment $A_I$ and segment $A_{II}$ (measurement point $MP_I$) is 50% to 55% of the material thickness $MP_0$ of the hub fitting flange, the material thickness at the transition of segment $A_{II}$ to segment $A_{III}$ ($MP_{II}$) is 45% to 52% of the material thickness $MP_0$, at the transition of segment $A_{III}$ to $A_{IV}$ (measurement point $MP_{III}$) it is 45% to 53% of the material thickness $MP_0$, at the transition of segments $A_{IV}$ to $A_V$ (measurement point $MP_{IV}$) it is 49% to 54% of the material thickness at the hub fitting flange $MP_0$ and at the transition between segment V and the disc edge ($MP_V$) it is 40% to 50% of the material thickness at the hub fitting flange.

In the region of the material thickening in the fourth segment the material thickness increases to 55% to 65% of the material thickness of the hub fitting flange $MP_0$, while in the straight region of segment $A_{II}$ it is reduced to 45% to 50% of the material thickness $MP_0$.

The special geometrical relations of the wheel disc in its transition region lead to a substantial material and weight saving as compared to known wheel discs of the same rated diameter and disc depth, which can amount to around 10% in the case of the disc of a wheel with 22.5 inch diameter.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A wheel disc for a wheel with an essentially radially extending hub fitting flange and an essentially cylindrical disc edge being joinable to a wheel rim, and with a transition region extending between the hub fitting flange and the disc edge, wherein the transition region is subdivided into at least five segments ($A_{I\ to\ V}$) passing into each other or into the hub fitting flange or the disc edge, each of which has an outer end situated closer to the hub fitting flange and an inner end situated closer to the disc edge, wherein the segments have a curvature at least on a partial region of their length between their outer end and their inner end and the curvatures of neighbouring segments have different directions of curvature, wherein the individual segments have at their inner ends a larger radial distance from an axis of rotation of the wheel disc than at their outer ends and wherein the wheel disc in its transition region has a variable material thickness, and wherein the ratios of the material thicknesses of the individual segments at their respective inner ends to their respective outer ends and the ratio of their lengths in the axial direction of the wheel disc to their heights in the radial direction are chosen as follows:

| | Ratio of Material thickness at inner end to Material thickness at outer end | Ratio of Length in axial direction to Height in radial direction |
|---|---|---|
| First segment $A_I$ (between the hub fitting flange and the second segment $A_{II}$) | 0.45-0.7 | 0.9-1.1 |
| Second segment $A_{II}$ (between $A_I$ and $A_{III}$) | 0.7-1.0 | 1.6-1.9 |
| Third segment $A_{III}$ (between $A_{II}$ and $A_{IV}$) | 0.9-1.25 | 2.5-2.8 |
| Fourth segment $A_{IV}$ (between $A_{III}$ and $A_V$) | 0.9-1.25 | 2.8-3.1 |
| Fifth segment $A_V$ (between $A_{IV}$ and the disc edge). | 0.7-1.15 | 6.0-6.8 |

2. The wheel disc according to claim 1, wherein the second segment ($A_{II}$) and/or the third segment ($A_{III}$) has a subsegment (UA*) without curvature extending over a partial region of the segment length.

3. The wheel disc according to claim 2, wherein the subsegment (UA) has a material thickness ratio of 0.9 to 1.25 and a length to height ratio of 1.4 to 1.7.

4. The wheel disc according to claim 1, wherein the material thickness of the first segment ($A_I$) passing into the hub fitting flange at its outer end corresponds to the material thickness of the wheel disc in a region of the hub fitting flange.

5. The wheel disc according to claim 1, wherein the material thickness of the fifth segment ($A_V$) passing into the disc edge at its inner end corresponds to the material thickness of the wheel disc in a region of the disc edge.

6. The wheel disc according to claim 1, produced on a flow forming machine by flow forming of a metallic blank, during elongation of a preformed marginal region adjoining the clamped hub fitting flange.

7. The wheel disc according to claim 6, in which the metallic blank is a steel blank.

8. The wheel disc according to claim 1, wherein the fourth segment ($A_{IV}$) between its inner end and its outer end has a material thickening whose thickness is 1.1 to 13 times the material thickness at the outer end of the fourth segment ($A_{IV}$).

9. The wheel disc according to claim 1, in which the hub fitting flange after making ready a wheel disc blank by flow forming of a metallic, is machined in a cutting process, and in which the transition region has an overall axial length, measured from an inside of the hub fitting flange to the inner end of the fifth segment ($A_{IV}$) bordering on the disc edge, wherein the segments of the transition region extend:

Segment $A_I$ from the inside of the hub fitting flange to 9% to 12% of the overall axial length Segment $A_{II}$ from the inner end of segment $A_I$ to 43%46% of the overall axial length Segment $A_{III}$ from the inner end of segment $A_{II}$ to 70%-75% of the overall axial length Segment $A_{IV}$ from the inner end of $A_{III}$ to 93%-97% of the overall axial length Segment $A_V$ from the inner end of $A_{IV}$ to the start of the disc edge.

10. The wheel disc according to claim 9, wherein the material thickness of the transition region at transition points ($MP_{1\ to\ 5}$) between the segments, in relation to a material thickness ($MP_0$) of the hub fitting flange is

| Transition | $A_I/A_{II}$ | = $MP_I$ | : 50-55% · $MP_0$ |
|---|---|---|---|
| Transition | $A_{II}/A_{III}$ | = $MP_{II}$ | : 45-52% · $MP_0$ |
| Transition | $A_{III}/A_{IV}$ | = $MP_{III}$ | : 45-53% · $MP_0$ |
| Transition | $A_{IV}/A_V$ | = $MP_{IV}$ | : 49-54% · $MP_0$ |
| Transition | $A_V$/disc edge | = $MP_V$ | : 40-50% · $MP_0$. |

11. The wheel disc according to claim 10, wherein the material thickness of the second segment between its ends or transition points ($MP_I$, $MP_{II}$) is reduced to a value of 45% to 50% of the material thickness $MP_0$ of the hub fitting flange.

12. The wheel disc according to claim 10, wherein a material thickening in the fourth segment is 55 to 65% of the material thickness ($MP_0$) of the hub fitting flange.

13. The wheel disc according to claim 9, in which the metallic is a steel blank.

14. The wheel disc according to claim 9, in which the cutting process is on a lathe.

* * * * *